United States Patent [19]

Vest

[11] Patent Number: 4,818,917
[45] Date of Patent: Apr. 4, 1989

[54] FLUORESCENT LIGHTING BALLAST WITH ELECTRONIC ASSIST

[76] Inventor: Gary W. Vest, 6305 Barberton Ave., Cleveland, Ohio 44102

[21] Appl. No.: 882,474

[22] Filed: Jul. 7, 1986

[51] Int. Cl.$^4$ .............................................. H05B 37/00
[52] U.S. Cl. .................................... 315/171; 315/172; 315/174; 315/176; 315/33; 315/206; 315/208
[58] Field of Search ......... 315/176, 276, 206, DIG. 2, 315/DIG. 5, 33, 174, 175, 200, 205–208, 219, 246, DIG. 7, 308

[56] References Cited

U.S. PATENT DOCUMENTS 3,544,839 12/1970 Fähnrich .......................... 315/200 R
4,187,448 2/1980 Kuroi et al. .......................... 315/176

Primary Examiner—David K. Moore
Assistant Examiner—Mark R. Powell
Attorney, Agent, or Firm—Watts, Hoffmann, Fisher & Heinke

[57] ABSTRACT

A ballasting circuit for fluorescent lamps includes a series-connected current limiting ballast element and an electronic assist circuit. The ballast element has a high voltage side connectable to a commercial 110 VAC/60 hertz power source and a low voltage side connected in series with the lamp. The electronic assist circuit has a full wave bridge rectifier input means connected to the low voltage side of the ballast element and a transformer output means connected in series between the ballast element and the lamp. The electronic assist circuit generates a relatively high frequency, high voltage excitation signal prior to lamp conduction to assist in starting the lamp. After lamp conduction begins, the low voltage side of the ballast element drops to the normal operating voltage of the lamp and the excitation signal amplitude correspondingly drops, but is not eliminated, so as to maintain lamp operation with low frequency power supplied from the commercial power source.

14 Claims, 1 Drawing Sheet

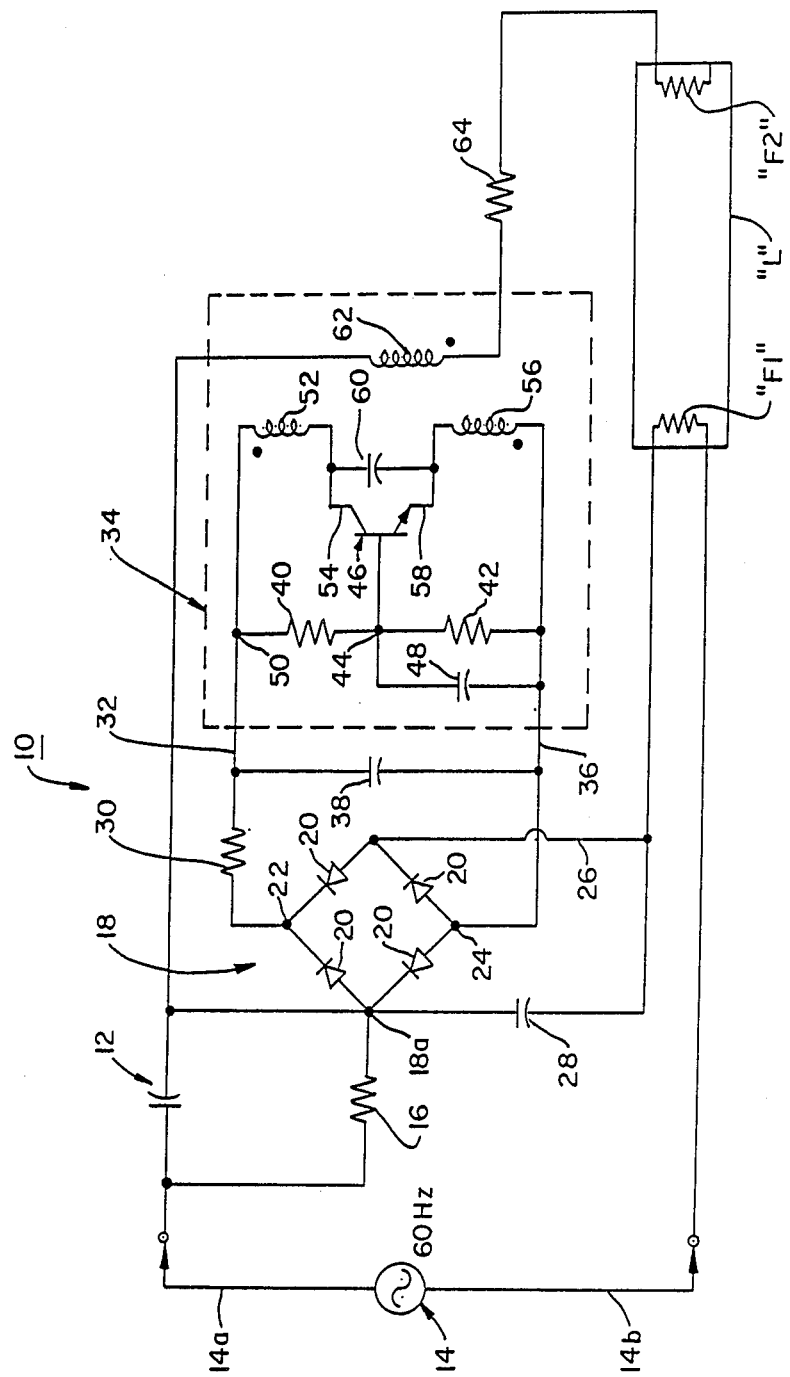

FLUORESCENT LIGHTING BALLAST WITH ELECTRONIC ASSIST

BACKGROUND OF THE INVENTION

1. TECHNICAL FIELD

The invention relates generally to circuits for powering fluorescent lamps. More specifically, the invention relates to ballast circuits for starting and operating fluorescent bulbs and lamps.

2. DISCUSSION OF RELATED ART

An important aspect of any fluorescent lighting system is a suitable ballasting technique. Over the years one of the most common ballast designs from reliability, compactness, and cost viewpoints has been an inductive ballast such as a laminated, iron-core inductive type. While these inductive ballasts are suitable in terms of electrical operating characteristics, they tend to incur substantial heat losses which result in a low efficiency. Furthermore, the inductive-type ballasts are quite heavy and this excessive weight often precludes having the ballast and lamp or bulb as an integral structure. For example, in a hand-held auxiliary lamp or emergency light, a standard inductive ballast is too heavy and cumbersome and hence is usually provided inconveniently as a separate element at the plug end of the power cord.

In addition to efficiency and weight considerations, ballast designs for fluorescent lights should provide for filament preheating prior to discharging the lamp to achieve more reliable starting. Filament preheating also extends the life of the lamp by preventing excessive material blow-off from the filaments upon discharge. Furthermore, continued but reduced filament heating during steady-state operation of the fluorescent light contributes to extended life.

Another important consideration is that DC operation can substantially shorten lamp life by a phenomenon called "mercury pump" which is the migration of mercury from one end of the lamp to the other. On low power and short-length bulbs this effect can be substantial. Also, high frequency operation results in improved lighting efficiency; though the effects of high frequency operation on lamp life are unknown, they are expected to be favorable.

Many attempts have been made to replace or improve the common inductive ballast with electronic circuits. Examples are shown in U.S. Pat. Nos. 4,320,325 issued to Anderson; 4,117,377 issued to Jimerson et al.; 4,378,514 to Collins; 4,463,286 to Justice; 4,388,562 to Josephson; 4,437,042 to Morais et al.; 4,484,109 to Buser and 4,330,736 to Perper. However, some of these devices still utilize a heavy inductive ballast and still others require a substantial number of components which inherently reduces reliability and maintainability while increasing costs. These negative factors are very undesirable since they obliterate any benefit of avoiding use of an inductive ballast.

It is apparent, therefore, that the need has long existed and continues to exist for a lightweight flourescent ballast which utilizes a reduced number of circuit elements so as to provide maximum reliability at minimal cost.

SUMMARY OF THE INVENTION

The present invention completely overcomes the aforementioned failures of the prior art efforts by providing a ballasting circuit for flourescent lamps which is lightweight and compact and utilizes a substantially reduced number of components. The ballast further provides very reliable start-up and operation of flourescent lamps yet can be made at a substantially reduced cost. The invention particularly contemplates a ballast circuit adapted for use with a hand-held utility or emergency light, however, the system is used advantageously in connection with many types of fluorescent lighting applications.

According to one aspect of the invention, a circuit for starting and operating flourescent lamps includes a current limiting ballast which provides an AC operating power signal to the lamp. The ballast is connectable in series between a power source, such as a 60 cycle, 110 VAC commercial power supply and the lamp.

According to another aspect of the invention, an electronic assist oscillator circuit is provided in combination with the current limiting ballast for providing a high voltage, high frequency starting or excitation signal to the lamp. The electronic assist circuit is connected in such a manner that after the lamp discharges, the excitation output signal of the assist circuit is reduced. The high frequency assist signal, however, is present even during steady-state operation of the lamp. Main operating power to the lamp during steadstate, however, is primarily provided from the low frequency power source.

According to another aspect of the invention, an electronic assist circuit is shown which utilizes a small number of components for excellent reliability and low cost yet achieves reliable lamp start-up and operation. The electronic assist circuit has an output connected in series between the current limiting ballast and lamp and superimposes the excitation signal on the operational power signal.

According to another aspect of the invention, a ballasting circuit is shown which permits one or more of the lamp filaments to be pre-heated before the lamp is started and continues heating the filament at a reduced level after the lamp is started. Also, the electronic assist circuit ceases operation if and when the filament breaks.

These and other aspects of the present invention will be more fully described in and understood from the following specification in view of the accompanying drawing.

BRIEF DESCRIPTION OF THE DRAWING

The drawing is an electrical schematic diagram of a ballasting circuit according to the present invention.

DETAILED DESCRIPTION OF THE PREFERRED EMBODIMENT

A ballast circuit according to the present invention is generally indicated by the numeral 10 in the drawing. The ballast circuit is particularly shown in use with a fluorescent discharge-type arc lamp designated "L". Preferably the lamp is a relatively low power lamp, for example 8 watts, which can be used as a portable handheld utility or emergency light. However, it will be apparent that different power lamps can be used and that the general principals of the instant invention are not limited to the specific application illustrated in the drawing.

The ballasting circuit 10 includes a capacitive ballast element 12 (or other current limiting ballast element) having a high voltage side connectable to a power source 14 via an input line 14a. The power source return line 14b is connected to one of the lamp filaments "F1"

as illustrated. The power source 14, for example, can be a commercial power outlet providing 110 VAC at 60 cycles per second. A particular advantage of the present invention which should be noted at this point is that the steady-state main operating power for the lamp is primarily provided from the commercial power supply without substantial frequency or amplitude modification thereof. This is significant as no circuitry is required to provide a main operating power signal having a higher frequency or voltage than the commercial power source input. Also, use of an AC power signal during stead-state extends lamp life as described hereinbefore.

A supply resistor 16 is connected in parallel with the ballast capacitor 12 and provides input power to a conventional full-wave bridge rectifier 18 at the input node 18a. The rectifier 18 consists of rectifying diodes 20 connected as illustrated to provide a full wave rectified voltage signal at a DC output node 22 with respect to a DC reference node 24. Of course, the voltage at node 22 is a pulsed DC consisting of each half wave of the AC power signal from the power source 14. The return line 26 for the rectifier 18 is connected to the lamp filament "F1" as illustrated to complete a circuit back to the power source 14. An optional filter capacitor 28 can be provided across the input nodes of the rectifier 18 to filter high frequency noise from passing back into the power source.

A current-limiting power resistor 30 is serially connected between the rectifier 18 and a DC power input line 32 of an electronic assist oscillator circuit generally indicated by the numeral 34 outlined in the drawing with the dashed lines. The reference node 24 of the rectifier 18 is connected to a return line 36 of the electronic assist circuit 34. Thus, the rectifier 18 acts as a DC voltage input supply means for the electronic assist circuit 34. A filter capacitor 38 can be provided as illustrated to filter high frequency noise generated by the assist circuit 34, as well as to serve the purpose of a typical power supply filter capacitor.

The value of the capacitor 38 may typically be much lower in value than is commonly found in power supply filter capacitors. Accordingly, the high frequency output of the electronic assist circuit has a return path but is modulated by the 60 cycle half wave pulses of the main power source.

The electronic assist circuit 34 is essentially a high frequency oscillator which utilizes a coreless (or air-core) transformer to convert and step-up the DC supply voltage from the rectifier 18 to an AC excitation signal level sufficient to start or discharge the lamp.

A voltage divider circuit consisting of two series-connected resistors 40, 42 provides a stepped-down transistor base bias voltage at a branch node 44 which is connected to the base lead of an oscillator power transistor 46. A tuning capacitor 48 is connected in parallel across the lower branch resistor 42 to provide the requisite feedback to the base drive of the transistor 46 for high frequency oscillation.

A first transformer primary winding 52 is connected between the DC power line 32 at a node 50 and the collector lead 54 of the transistor 46. A second transformer primary winding 56 is connected between the emitter lead 58 of the transistor 46 and the return line 36 thereby completing a circuit back to the rectifier or DC supply 18. A stabilizing capacitor 60 can be provided as illustrated across the collector and emitter terminals of the transistor 46 for stabilizing and tuning the oscillator frequency.

The transformer primary windings 52, 56 cooperate with the tuning capacitor 48 to cause a high frequency oscillation during each DC pulse cycle from the rectifier 18 appearing at the power node 50. Thus, the voltage developed in the primary windings 52,56 is in the nature of an amplitude modulated wave. The illustrated oscillator 34 is designed to oscillate at about 435 KHz and, of course, the modulated frequency is about 60 Hz (the frequency of the power source 14).

The transformer primary windings 52, 56 are coupled to an output secondary winding 62. An air core transformer is preferred because of the desired high frequency of operation.

However, successful operation may also be obtained using ferrite core transformers typically at a somewhat lower operating frequency. It is, never the less desirable to eliminate the ferrite core for cost reasons. This may result in some decrease in the power transfer ability of the assist circuit, but since it is not the main source of power to the fluorescent bulb the result is improved power regulation and the minimizing of the power handling requirements of the assist circuit.

The output secondary winding 62 is serially connected between the capacitive ballast 12 and a second filament "F2" of the lamp as illustrated. Thus, the voltage output of the electronic assist oscillator circuit 34 is superimposed over the main operating power signal from the capacitive ballast 12. A current limiting power resistor 64 may be provided as illustrated. The coupling between the primary and secondary windings of the transformer is such as to produce about a 1,200 volt peak-to-peak excitation voltage across the lamp prior to discharge.

After the lamp discharges and arcs over (i.e. illuminates), the lamp arc voltage maintains a fairly constant voltage of about 50 volts. This causes a substantial drop in the voltage level at the input node 18a to the rectifier 18. This voltage drop necessarily occurs since the lamp, when operating in a steady-state condition, acts as a voltage regulator by maintaining a relatively constant arc voltage. The reduced voltage at the input node 18a in turn causes a substantial reduction in the output voltage and current from the electronic assist oscillator circuit 34.

Main operating power during steady-state is supplied via the capacitive ballast 12 to the lamp such that the steady-state operating power primarily comes from the low frequency 60 Hz commercial power source 14. Because of a zero cross-over inherent in any AC commercial power signal with reference to the return line 14b, however; the lamp would extinguish due to insufficient drive current if only the capacitive ballast 12 were used with the lower frequency power source. While the current limiting resistor, 64, tends to help to prevent this, the lack of current regulation resulting from either a purely capacitive or purely resistive ballast, or a combination thereof, as in this case, would at best result in a flickering condition of the fluorescent lamp, if not total extinguishment at the crossover point. Accordingly, to maintain the lamp in a conducting mode, the ballast capacitor 12 is selected so that when the lamp begins conducting, the oscillator 34 output is reduced but not cut off altogether. The oscillator 34 continues to superimpose a low level high frequency current drive signal on the 60 cycle main power signal from the ballast 12 to maintain the lamp conducting through the zero crossover periods. Furthermore, if the lamp does begin to extinguish, the voltage at the input node 18a will correspondingly increase (due to the reduced load on the power source 14) thereby driving the assist circuit 34 harder so as to deliver greater excitation power to the lamp. Thus, the excitation voltage of the assist circuit 34 is inversely related to the conduction state of the lamp.

As noted, the first described lamp filament "F1" is connected in series in the return line 14b between the rectifier 18 and the power source 14. This series connection provides filament preheating in order to extend the lamp life and also provides continued filament heating even after lamp conduction begins. Furthermore, in the event that the filament breaks, the return line for the rectifier 18 becomes electrically open thus rendering the electronic assist circuit 34 inoperative. This reduces the likelihood of damage to the electronic assist circuit from prolonged use by cutting off input power to the circuit when there is no possibility of the lamp conducting.

Tremendous advantages of the described circuit are now readily discernible. For example, a simple current limiting ballast can be utilized for steady-state ballasting of a flourescent lamp from any conveniently available low-frequency commercial power outlet. The high frequency, high voltage signal from the electronic assist oscillator circuit 34 provides sufficient and reliable starting power to the lamp and permits use of a low frequency steady-state operating power signal. By driving the assist circuit 34 from the low voltage side of the capacitive ballast 12 or other current limiting ballast, the oscillator 34 drive output is automatically a function of the conduction of the lamp.

Furthermore, the small number of components needed to implement the invention permits a significant cost savings with inherently improved reliability. Also, the entire ballast circuit 10 can easily be assembled on a standard circuit board and be adapted to mount within a lighweight lamp case 66 (only represented schematically in the drawing) making it particularly suited for handheld utility and emergency lamps.

By way of example, the following table lists component values or types which have been found to be particularly suited for use with the present invention, however, such information is for purposes of illustration only and is not to be understood in a limiting sense.

| COMPONENT | VALUE OR TYPE |
| --- | --- |
| Bridge rectifier diodes | 1N4004 |
| Transistor 46 | MJE13003 |
| Capacitor 12 | 5.6 μF |
| Capacitor 60 | 0.0033 μF |
| Capacitor 48 | 0.01 μF |
| Capacitor 38 | 0.047 μF |
| Capacitor 28 | 0.047 μF |
| Resistor 30 | 20 ohm |
| Resistor 40 | 75 Kohm |
| Resistor 42 | 4.7 Kohm |
| Resistor 64 | 4.7 ohm |
| Resistor 16 | 4.7 Kohm |
| Transformer primary winding 52 | 150 turn, #32 wire |
| Transformer primary winding 56 | 10 turn, #32 wire |
| Transformer secondary winding 62 | 330 turn, #28 wire |

While a capacitive ballast may be preferred on lower powered lights, on higher wattage bulbs other types of current limiting ballasts may be used. For example, a solid state electronic ballast element may be used as a resistive element. Thus, the series ballasting component could be any number of passive or active electrical components which, if used alone, may not have the capability of developing adequate starting voltage for a particular fluorescent bulb, but when combined in accordance with the invention with an electronic assist circuit, would provide reliable operation under a broad set of operating conditions.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A circuit for starting and operating a gaseous discharge lamp having spaced apart first and second lamp electrodes, said circuit comprising:
    (a) a current limiting ballast means for providing steady-state operating power from an alternating current power source to the lamp, said ballast means having a high voltage side connectable to an input from the alternating current power source, and
    (b) oscillator means for providing relatively high voltage and high frequency excitation power with respect to the alternating current power source to start the lamp, and for providing reduced amplitude high frequency power during lamp operation said oscillator means having
        (i) rectifier means connected to a low voltage side of said ballast means and coupleable to a return line of said power source, and
        (ii) an oscillator for producing a signal at the high frequency and having a high frequency output means connected in series with said ballast means and said first and second lamp electrodes,
    (c) said excitation power being applied to the oscillator means through said rectifier means to start the lamp and as a lamp conduction begins there is a reduction in voltage across the rectifier means and a corresponding reduction in said excitation power coupled through the output means in series with the lamp electrodes.

2. A circuit as defined in claim 1, wherein said series connected current limiting ballast means is a capacitor.

3. A circuit according to claim 1, wherein the power source is a standard commercial power source of about 110 VAC at 60 hertz, wherein the lamp is powered during steady-state operation primarily by the power source.

4. A circuit according to claim 3, wherein during steady-state operation the lamp is powered by a 60 hertz signal from the power source with a high frequency component superimposed thereon by said oscillator means.

5. A circuit according to claim 4, wherein said oscillator means generates greater excitation power when the lamp is not conducting and less power once the lamp begins to conduct.

6. A circuit according to claim 5, wherein the lamp, said capacitive ballast means and oscillator means are assemblable within a hand-held housing to provide a lightweight portable utility or emergency light.

7. A circuit according to claim 6, wherein said rectifier means comprises a full-wave bridge rectifier which includes an input node connected to said capacitive ballast low voltage side and a return node connected to a return line to the power source, there being a lamp filament connected in series between said rectifier return node and the power source such that if the filament breaks said oscillator means is rendered inoperative.

8. A circuit according to claim 7, wherein said oscillator means includes a single power transistor and an air core step-up transformer.

9. A circuit according to claim 8, wherein said excitation power constitutes a 60 hertz modulated voltage waveform having a carrier frequency greater than 400 kilocycles per second and a voltage amplitude of about 1200 volts peak-to-peak.

10. A circuit according to claim 2, wherein when lamp conduction begins said capacitive ballast low voltage side is substantially maintained at a normal operating voltage of the lamp.

11. In combination a series-connected current limiting ballast means and an electronic assist circuit for starting and operating a self-contained hand-held fluorescent lamp from a standard 110 VAC/60 hertz power source, said ballast means including a high voltage side connectable to the power source and a low voltage side connected in series with the lamp, said electronic assist circuit including an input means connected to said ballast means low voltage side and a step-up transformer output means connected in series between said ballast means and the lamp, said input means converting AC power from the power source to a corresponding DC power signal, said electronic assist circuit further including an oscillator means powered by said DC power signal for generating a relatively high frequency signal, said step-up transformer converting said oscillator means high frequency signal to a higher voltage excitation signal with respect to the power source whereby a maximum excitation signal is applied across the lamp prior to lamp conduction and after lamp conduction begins power to said electronic assist circuit is reduced resulting in a corresponding amplitude reduction in said excitation signal so that steady-state operating power is primarily supplied from the low frequency power source via said ballast means and in part by said electronic assist circuit.

12. The circuit of claim 1 wherein the oscillator means comprises an oscillator circuit coupled to the rectifier means, and a step-up transformer having a primary winding coupled to the oscillator circuit and a secondary winding coupled in series with the ballast means and the second lamp electrode.

13. The circuit of claim 12 wherein the set-up transformer is an air core transformer.

14. A circuit for starting and operating a gaseous discharge lamp having spaced apart first and second lamp electrodes, said circuit comprising:
(a) a current limiting ballast means for providing steady-state operating power from a power source to the lamp, said ballast means having a high voltage side connectable to an input from the power source, and
(b) oscillator means for providing relatively high voltage alternating current excitation power with respect to the power source to start the lamp and for providing reduced amplitude high frequency power during lamp operation, said oscillator means having:
(i) power take-off means connected to a low voltage side of said ballast means and coupleable to a return line of said power source; and
(ii) an oscillator for producing a high voltage alternating current signal having an output connected in series with the ballast means and the first and second lamp electrodes;
(c) said excitation power being applied to the oscillator means through said power take-off means to start the lamp and as lamp conduction begins there is a reduction in voltage at the power take-off means and a corresponding reduction in said excitation power coupled through the output means in series with the lamp electrodes.

* * * * *